Oct. 20, 1942.    W. L. DAVIS    2,299,079
RELIEF VALVE
Filed Sept. 15, 1939    4 Sheets-Sheet 1

Inventor;
Walwin L. Davis

By Young, Emery & Thompson
Attys.

Oct. 20, 1942. W. L. DAVIS 2,299,079
RELIEF VALVE
Filed Sept. 15, 1939 4 Sheets-Sheet 2
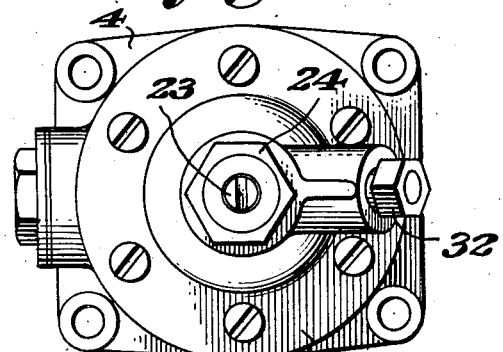
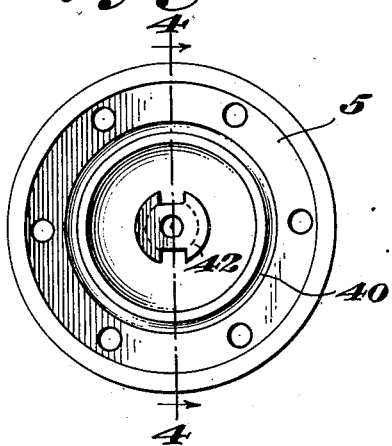
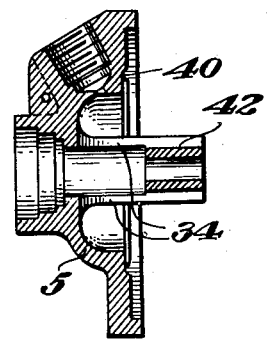
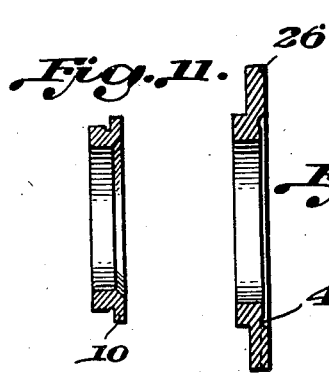
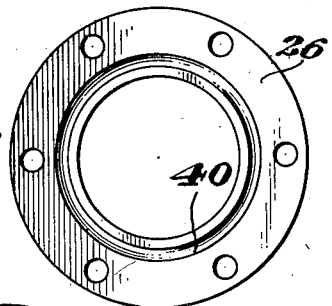
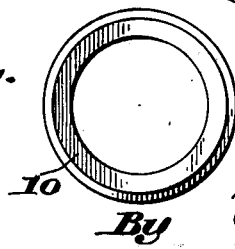
Inventor:
Walwin L. Davis
By Young, Emery & Thompson
attys.

Oct. 20, 1942.   W. L. DAVIS   2,299,079
RELIEF VALVE
Filed Sept. 15, 1939   4 Sheets-Sheet 3
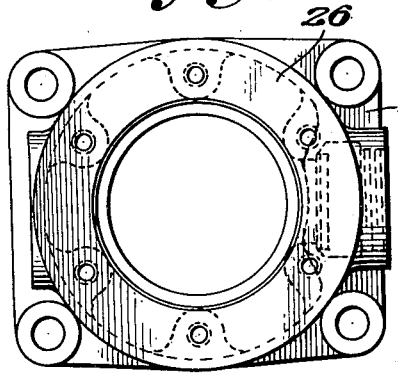
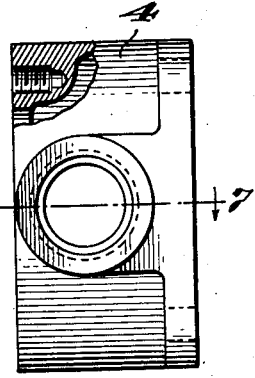
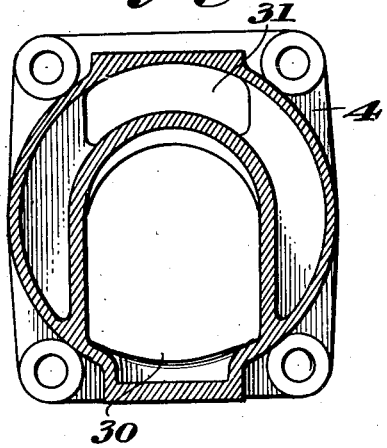
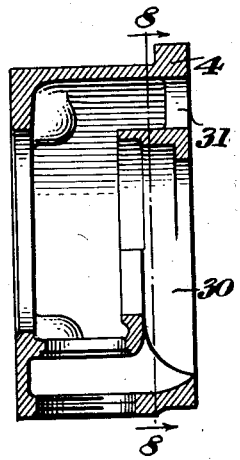
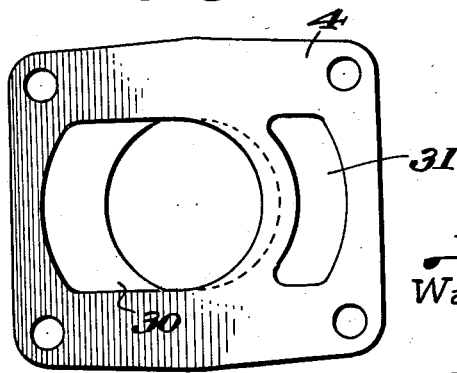
Inventor:
Walwin L. Davis
By Young, Emery & Thompson
Attys

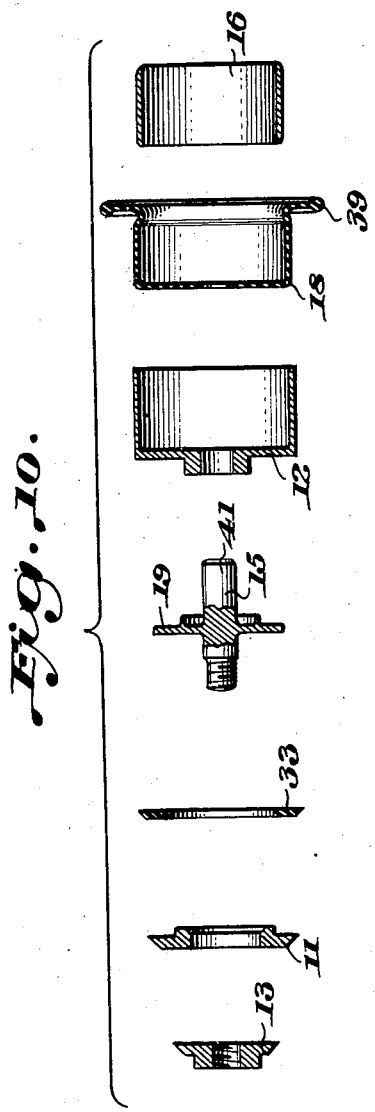
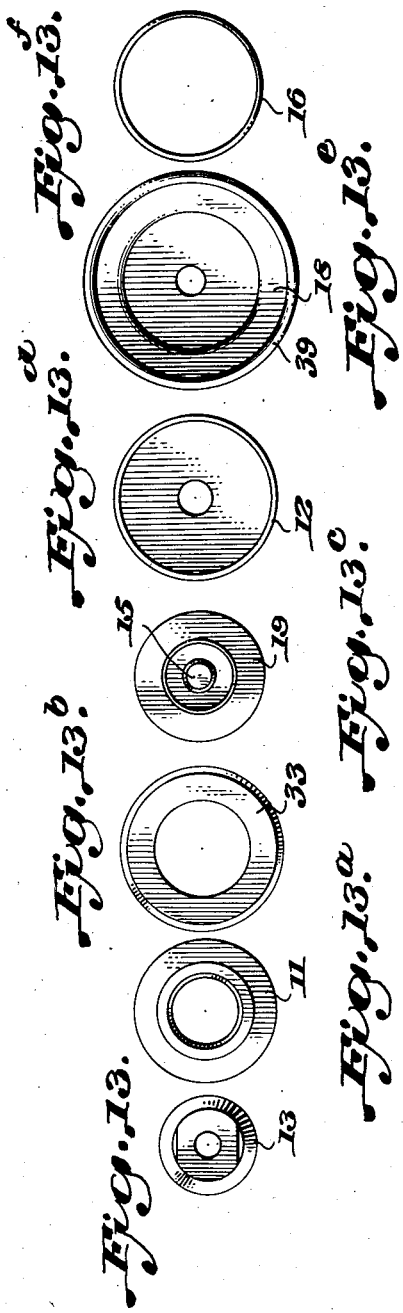

Patented Oct. 20, 1942

2,299,079

UNITED STATES PATENT OFFICE 2,299,079

RELIEF VALVE

Walwin L. Davis, Avon, Ohio

Application September 15, 1939, Serial No. 295,124

9 Claims. (Cl. 137—53)

The present invention relates to a relief valve, and particularly a balanced piston type relief valve for aircraft fuel pumps. The object of the invention is to maintain, within reasonable limits, a constant fuel pressure differential between a fuel and air intake to a carburetor and to accomplish this object by means of a balanced valve in which the excess fuel delivered by the pump is by-passed either to the suction port of the pump or back into a fuel tank or tanks. A still further object of the invention is to avoid the use of a valve in which a metal bellows, Sylphon or fabric diaphragm is utilized which give rise to metal fatigue, fabric stretch and other failures which result in erratic performance after a short period of time.

Further objects will be apparent from the following description taken in connection with the accompanying drawings in which:

Fig. 2 is a plan view of the relief valve,

Fig. 3 is a bottom view of the valve cap,

Fig. 4 is a cross-sectional view of the valve cap taken on line 4—4 of Fig. 3,

Fig. 5 is a plan view of the valve casing with the cup ring therein,

Fig. 6 is a side view of the valve casing,

Figure 16:
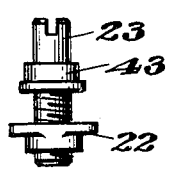
Figure 17:

Fig. 7 is a vertical sectional view of the valve casing taken on line 7—7 of Fig. 6, Fig. 8 is a cross-sectional view of the valve casing taken on line 8—8 of Fig. 7, Fig. 9 is a bottom view of the valve casing, Fig. 10 is a vertical sectional view of the diaphragm piston valve with all the parts individually spread out, Figs. 11 and 12 are vertical sectional views of the valve seat and the cup ring respectively, Figs. 13 to 13f are plan views of the diaphragm piston valve with all the parts individually spread out, Figs. 14 and 15 are plan views of the valve seat and cup ring respectively, Fig. 16 is a side view of the adjusting screw and its nut, and Fig. 17 is a plan view of the nut of Fig. 16.

The pump and relief valve comprises a lower casing 1 having inlet and outlet openings 2 and the pump 3 between the openings. The relief valve is provided in a valve casing 4 secured in any suitable manner to the lower casing 1 and this casing 4 has an upper casing or valve cap 5 secured thereto by means of screws 38.

The side of the casing 4 has a by-pass valve cap 6 screw-threaded therein fitting tightly against the casing by means of a gasket 7. A by-pass valve 8 is slidably mounted in the cap and is spring pressed by means of the spring 9 provided between the cap and valve. This by-pass valve 8 is guided in the valve cap 6 by means of a stem 45 sliding in the socket 46 on the cap 6 and the latter is screwed down tight on the gasket 7 to prevent leakage. The spring 9 maintains a tension on the by-pass valve 8.

In the casing 4 there is also provided a valve seat 10 on which a disc retainer 11 seats having a seating disc 33 thereon preferably of synthetic rubber. The cup disc 12 is mounted on and in the retainer 11 and a pilot stem 15 passes through the disc and has a nut 13 threaded on the end thereof with a pin 14 passing through the stem 15 and nut 13 to lock the latter on the stem. The disc 12 has an inner sleeve 16 and an outer sleeve 17 with a diaphragm cup 18, preferably of synthetic rubber between the two sleeves, Figs. 1, 10 and 13. The cup 18 is held on the disc 12 by means of the abutment plate 19 which latter forms an abutment for the spring 20 and is integral with the stem 15.

Figure 1:
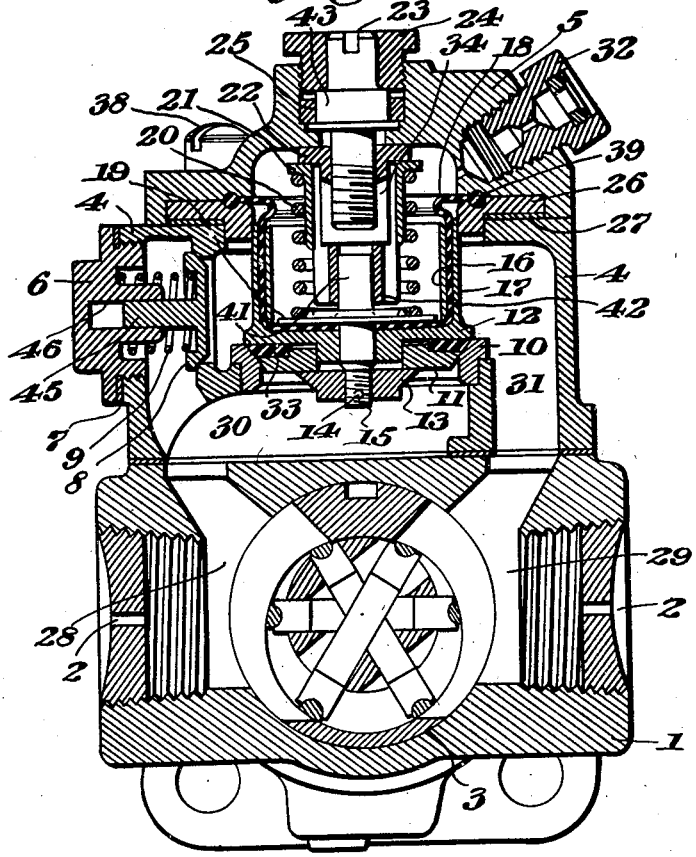
Figure 1 is a vertical sectional view of the valve and pump.

The spring 20 presses and seats against a cylindrical member 21 which acts as a guide for the spring 20 and abuts against an adjusting nut 22, Figs. 1, 16 and 17. The nut 22 is adjustable by rotating the screw bolt 23 mounted in the cap 24 which latter is screwthreaded in the upper casing 5. A bushing 25 is provided around the screw 23 and in the casing 5.

The diaphragm 18, preferably of synthetic rubber, is peripherally secured between the casing 5 and the cup ring 26, the latter seating on a gasket 27. To secure the diaphragm 18 the latter is provided with a beaded rim 39 which fits in corresponding grooves 40 in the casing 5 and the ring 26.

The chambers 28 and 29 in the casing 1 adjacent the inlet and outlet openings 2 communicate with passages 30 and 31 in the casing 4.

The large flange or abutment plate 19, Figs. 1 and 10, contacts the diaphragm cup 18 on the inside of the piston and this part is fitted on one end and the valve cup tightens the various parts together to form an air tight assembly. This valve pilot or stem 15 also has a portion 41, Figs. 1 and 10, which is free to slide in a guide 42 which is part of and integral with the valve cap 5. The adjusting screw 23 is retained in the valve cap 5 by means of a bushing 25 and the screw cap 24. The screw cap 24 tightens down on the shoulder 43, Figs. 1 and 16 of the adjusting screw 23 which securely locks it in position when the required adjustment has been made. The bushing 25 is a press fit in the valve cap, the purpose of which is to prevent the adjusting screw 23 from being forced out by the spring load, in the event the adjusting screw is removed from the valve cap. The adjusting nut 22, Figs. 1, 16 and 17, is a wing type nut, the two wings being free to slide in two longitudinal slots 34, Figs. 1 and 4, machined in the valve cap 5. These slots also prevent the adjusting nut 22 from turning when the adjusting screw 23 is turned. Both parts being threaded, turning the adjusting screw 23 advances the position of the adjusting nut 22 in its slots 34 thereby increasing or decreasing the spring load on the valve. The spring guide 21 is used to eliminate any tendency for the spring to catch in the slots of the guide.

The purpose of a relief valve on an aircraft fuel pump is to maintain within reasonable limits a constant fuel pressure differential between the fuel and the air intake to the carburetor. This is accomplished by by-passing the excess fuel delivered by the pump either to the suction port of the pump or back into the fuel tanks. There are a number of variable conditions which affect an ordinary type of relief valve and therefore the balanced valve of the present invention meets these varying conditions. One of the variable conditions is the change of suction lift from the tanks to the inlet port of the pump caused by the varying level of the fuel in these tanks, and the angle at which the plane is flying, that is whether in a climb or dive, also greatly affects the suction lift or head as the case may be, from the fuel tanks to the inlet port of the pump. Variable inlet pressures to the pump are also caused by surges in the fuel line due to accelerating or decelerating conditions.

In order to construct a valve in which these varying inlet pressures do not affect the discharge pressure, it is necessary that the valve opening area be balanced with an equal area in such a way that any forces created by a varying inlet pressure will work in the opposite direction. This has been previously accomplished by using a metal bellows or Sylphon and in some cases, a fabric diaphragm. The difficulties that have been encountered with the last two mentioned types of construction is that the metal bellows is highly susceptible to failure caused by the fatigue of the material due to the high period of vibration when this unit is mounted on an aircraft engine. The fabric diaphragm type of valve is a difficult construction proposition. The fabric tends to stretch to some extent thereby changing the effective area of the diaphragm or imposing a strain on one side of the relief valve in its seat. The result is erratic performance after a short period of time.

Another purpose of the relief valve is to balance the fuel pressure with the air pressure to the carburetor in exhaust turbo-supercharger installations in which the super-charger is required to build the air pressure up to approximately sea level conditions at the inlet of the carburetor when the aircraft is flying at high altitudes. It is evident that if the air pressure to the carburetor is built up without building the fuel pressure up in accordance with this increased pressure, the air pressure in some cases might exceed the fuel pressure to the carburetor and there would be no flow of fuel to the engine. The valve of the present invention will automatically balance this increased air pressure if an air line is run from the intake of the carburetor to the pipe capped port in the valve cap 5. Figure 1 of the drawings now shows a special pipe plug 32 screwed into this port which is used when the air line from the carburetor is not installed. Of course it has to be removed when this air line is used. The purpose of this air line is to increase the pressure on the inside of the valve assembly as the air pressure increases to the carburetor. This increased air pressure on the inside of the valve has the effect of forcing the valve 11 down harder on its seat 10 and thereby increasing the fuel pressure delivered to the carburetor in direct proportion to the increase in fuel pressure thereby obtaining a constant pressure differential between the fuel pressure at the carburetor and the air pressure at the inlet of the carburetor.

To eliminate the objectionable bellow and diaphragm construction previously used, the present invention utilizes a piston principle which of course has a definite effective area and can easily be balanced with the effective area of the opening of the valve seat. This piston, which is shown as the outer sleeve 17 is free to slide up and down in the diaphragm cup ring 26. A slidable fit would leak at this point and the diaphragm cup 18, which is in reality a single convolution synthetic rubber bellows is utilized to form an effective seal. The convolution of this bellows which is shown as a diaphragm cup on the drawings, acts as a hinge and permits the outer sleeve 17 to slide with a minimum of friction in the diaphragm cup ring. The diaphragm cup by means of the small bead rim 39 on the outer or peripheral edge of the convolution permits it to be firmly clamped between the diaphragm cup ring 26 and the valve cap 5, thus forming a positive seal at this point. The inner sleeve 16 is assembled inside of the diaphragm cup and acts as a reinforcement for this part, thus preventing any tendency for this cup to collapse due to a high pressure being exerted on the inlet side of the fuel pump. It will be noted that the diaphragm cup 18 is entirely confined both inside and outside, by the metal sleeves 16 and 17 with the exception of the convolution which, as already mentioned, acts as a hinge.

The construction also utilizes a combination metal and synthetic rubber valve head. These parts are the head 33 and the disc retainer 11. The purpose of the synthetic rubber disc 33 is to assure an air tight contact with the valve seat 10. This is necessary especially at low engine R. P. M. when a slight leak through the valve would greatly reduce the discharge pressure of the pump due to the fact that the engine consumption closely approaches the capacity of the pump at low speeds. A rubber valve could be used were it not for the fact that it would soon be damaged by the constant action of the valve and it would also have a tendency to cold flow or otherwise change its shape due to the fact that the load of the valve spring would be exerted on this part when the pump is not in operation and no fuel is passing through the valve. To offset these objections the present invention utilizes the metal valve disc retainer 11 which carries the load of the valve spring 20 when the valve is on its seat. The synthetic rubber valve disc 33 extends a few thousandths of an inch beyond the retainer which assures an air tight contact with the seat.

The poppet-type valve 8 is what is termed the by-pass valve, the purpose of which is to permit fuel to be pumped from the inlet side of the pump to the discharge side of the pump, in the event the engine driven fuel pump should fail. A hand or emergency pump is usually connected to the inlet side of the engine driven pump for this purpose. In other words, the by-pass is in contact with a seat which is part of the valve body 4.

I claim as my invention:

1. A relief valve for fuel pumps comprising a casing having a valve seat therein, a disc retainer adapted to cooperate with the seat, and a cup-shaped piston valve secured to the retainer and comprising a diaphragm cup, an abutment plate for the bottom of the piston valve and a sleeve for the inside of the piston valve, said cup being mounted with the abutment plate and the sleeve on the inside thereof and the piston on the outside thereof which confines the diaphragm on the valve and having a small section at the rim end of the piston valve which acts as a hinge.

2. A relief valve particularly for aircraft fuel pumps, comprising a casing having a valve seat therein, and a combined metallic cup and synthetic rubber valve head in the casing adapted to cooperate with and contact the valve seat by both the metallic and rubber surfaces, said valve head comprising a synthetic rubber diaphragm cup inside said metallic cup and a metallic sleeve and an abutment plate on the inside of the diaphragm cup to reinforce the diaphragm cup and to maintain it in said metallic cup, said rubber cup projecting beyond the rim of the metallic cup to provide a seal.

3. A relief valve particularly for aircraft fuel pumps, comprising a casing having a valve seat therein, a combined metallic and synthetic rubber valve head in the casing and comprising a synthetic rubber diaphragm cup, a metallic sleeve on the inside of the cup, and a metallic cup disc in which the rubber cup is mounted; and a seating disc and retainer secured to the metallic cup disc and adapted to seat on the valve seat the rubber cup projecting beyond the rim of the metallic cup to provide a sealing portion.

4. A relief valve according to claim 3, in which means is provided to tightly secure the projecting portion of the synthetic rubber diaphragm cup in the casing.

5. A relief valve according to claim 3, in which means is provided to tightly secure the projecting portion of the synthetic rubber diaphragm cup in the casing, and said projecting portion of the synthetic rubber diaphragm forming a convolution adjacent the part where the rubber cup is secured to form a hinge part.

6. A relief valve for aircraft fuel pumps comprising a casing, a cup-shaped disc slidably mounted in said casing, a flexible cup-shaped diaphragm mounted in said disk and having an outer peripheral rim, means for securing the rim of the diaphragm in the casing, an abutment plate on the bottom portion of the diaphragm to maintain the bottom portion of the diaphragm on the bottom part of the disc, an internal sleeve on the internal side portion of the diaphragm, and cooperating valve means in the casing and secured to the outer bottom surface of the cup disc.

7. A relief valve for aircraft fuel pumps comprising a casing, a cup-shaped disc slidably mounted in said casing, a flexible cup-shaped diaphragm mounted in said disc and having an outer peripheral rim, means for securing the rim of the diaphragm in the casing, an abutment plate on the bottom portion of the diaphragm to maintain the bottom portion of the diaphragm on the bottom part of the disc, a sleeve on he internal side portion of the diaphragm, and a valve member provided on the external bottom portion of the disc cooperating with a seat in the casing.

8. A relief valve for aircraft fuel pumps comprising a casing, a cup-shaped disc slidably mounted in said casing, a flexible cup-shaped diaphragm mounted in said disc and having an outer peripheral rim, means for securing the rim of the diaphragm in the casing, an abutment plate on the bottom portion of the diaphragm to maintain the bottom portion of the diaphragm on the bottom part of the disc, a sleeve on the internal side portion of the diaphragm, a valve member provided on the external bottom portion of the disc cooperating with a seat in the casing, and spring means provided to urge the relief valve on the seat in the casing.

9. A relief valve for aircraft fuel pumps comprising a casing, a cup-shaped disc slidably mounted in said casing, a flexible cup-shaped diaphragm mounted in said disc and having an outer peripheral rim, means for securing the rim of the diaphragm in the casing, an abutment plate on the bottom portion of the diaphragm to maintain the bottom portion of the diaphragm on the bottom part of the disc, a sleeve on the internal side portion of the diaphragm, a valve member provided on the external bottom portion of the disc cooperating with a seat in the casing, and means extending through the bottom of the disc to act as a guide for the disc and to secure the valve member to the disc.

WALWIN L. DAVIS.